United States Patent
Staehlin

[11] Patent Number: 5,988,662
[45] Date of Patent: Nov. 23, 1999

[54] LEVER DRIVEN BICYCLE

[75] Inventor: John H. Staehlin, Lutherville, Md.

[73] Assignee: Volunteers for Medical Engineering, Baltimore, Md.

[21] Appl. No.: 08/871,458

[22] Filed: Jun. 9, 1997

[51] Int. Cl.[6] .................................................. B62M 1/00
[52] U.S. Cl. ........................... 280/253; 280/251; 74/89.2
[58] Field of Search .................................... 280/251, 255, 280/258, 253; 74/89.2, 89.21, 89.22, 594.1, 594.2, 594.3, 594.4, 594.5, 594.6

[56] References Cited

U.S. PATENT DOCUMENTS

| | | |
|---|---|---|
| 3,039,790 | 6/1962 | Trott . |
| 3,759,543 | 9/1973 | Clark . |
| 3,834,733 | 9/1974 | Harris . |
| 3,913,945 | 10/1975 | Clark . |
| 3,954,282 | 5/1976 | Hege . |
| 3,984,129 | 10/1976 | Hege . |
| 4,053,173 | 10/1977 | Chase, Sr. . |
| 4,300,784 | 11/1981 | Efros . |
| 4,421,334 | 12/1983 | Efros . |
| 4,445,701 | 5/1984 | Stroud . |
| 4,533,152 | 8/1985 | Clark . |
| 4,549,874 | 10/1985 | Wen . |
| 4,574,649 | 3/1986 | Seol . |
| 4,666,174 | 5/1987 | Efros ....................................... 280/258 |
| 5,335,927 | 8/1994 | Islas ......................................... 280/255 |
| 5,716,069 | 2/1998 | Bezerra et al. ...................... 280/253 X |
| 5,785,337 | 7/1998 | Ming ........................................ 280/255 |

FOREIGN PATENT DOCUMENTS

| | | |
|---|---|---|
| 0 088 448 | 9/1983 | European Pat. Off. . |
| 2735746 A1 | 12/1996 | France . |
| 31 39 637 | 4/1983 | Germany . |
| 3707669 A1 | 9/1988 | Germany . |
| 3800250 A1 | 7/1989 | Germany . |
| 42 26 432 | 2/1994 | Germany . |
| 2 246 986 | 2/1992 | United Kingdom . |

OTHER PUBLICATIONS

"Toying With Ideas Leads to Hit Products", Design News, pp. 19–20, Dec. 18, 1995.

*Primary Examiner*—Robert J. Oberleitner
*Assistant Examiner*—Pamela J. Lipka
*Attorney, Agent, or Firm*—Finnegan, Henderson, Farabow, Garrett & Dunner, L.L.P.

[57] ABSTRACT

This invention relates to an improved lever driven bicycle including a shifting mechanism for controlling a drive ratio between the oscillating lever and the drive wheel. The drive lever arrangement may be located about the front or rear wheels of the bicycle and, when about the rear wheel, may include a sole lever or dual levers. The drive lever arrangement includes a drive lever, a force applicator, a shifting mechanism, and a force converter which together transform the oscillating displacement of the lever to a rotation of the drive wheel. The shifting mechanism includes a slide block located about the lever which engages with the drive lever upon downward motion of the drive lever and controllably slides along the drive lever upon upward motion of the drive lever. The position of the slide block corresponds to a drive ratio between the drive lever and the drive wheel.

28 Claims, 8 Drawing Sheets

LEVER DRIVEN BICYCLE

BACKGROUND OF THE INVENTION

1. Field of the Invention

The present invention relates to bicycles specially designed for physically disabled riders, and more particularly to lever driven bicycles having simple shifting mechanisms for controlling the drive ratio between the lever and a drive wheel.

2. Description of Related Art

Typical bicycles are driven by crank systems which utilize unidirectional rotational movement to propel the bicycle drive wheel. Such unidirectional rotational movement results in a varying torque from zero, to a maximum, and back again to zero, for each half revolution. This motion is necessitated by the conventional crank design which includes a continuous chain that is received about a crank and a sprocket. Conventional bicycles also include shifting mechanisms which adjust the drive ratio between the crank and sprocket by controllably locating the chain about selected sprockets of different diameter.

These conventional crank driven bicycles with their varying torque are difficult or impossible to ride for those with certain physical disabilities, such as an amputee with only one leg, a person having one leg weaker than another, or possibly even a paraplegic who only has the use of his or her arms.

One possible solution to assist the physically disabled in riding a bicycle includes the design of a lever driven bicycle. Various lever driven bicycles have been designed which replace the conventional rotational drive with the oscillating displacement of a lever. Such lever driven bicycles utilize a dual lever arrangement in with each lever is oscillated individually by each leg of the rider. An example of this type of lever driven bicycle can be found in U.S. Pat. No. 3,039,790 to Trott. Lever driven bicycles have also been designed with shifting mechanisms which allow for manual control of the drive ratio between the lever and the drive wheel. In particular, U.S. Pat. No. 3,834,733 to Harris and U.S. Pat. No. 4,421,334 to Efros both disclose lever driven bicycles having shifting arrangements which allow the rider to manually adjust the drive ratio between the lever and drive wheel.

While the oscillating motion of the lever driven bicycle is more preferable for the physically disabled rider because of its substantially constant torque and less cumbersome linear movement, the lever driven bicycles to date still do not produce the efficient drive and ease of power application required by many persons with physical disabilities.

In light of the foregoing, there is a need for an improved lever driven bicycle which is uniquely designed to address the needs of the physically disabled.

SUMMARY OF THE INVENTION

Accordingly, an object of the present invention is to provide an improved lever driven bicycle which is specially designed for the unique needs of the physically disabled.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a lever driven bicycle having at least one drive lever pivotable about an axis, a force applicator connected to the drive lever for receiving an application force to rotate a drive wheel of the bicycle, a force converter for transferring the application force into a rotary motion of the drive wheel, and a shifting mechanism located about the at least one drive lever for selectively changing a drive ratio between the at least one drive lever and the drive wheel.

In accordance with another aspect, the present invention comprises a lever driven bicycle having only a single drive lever pivotable about an axis, a force applicator connected to the drive lever for receiving an application force to rotate a drive wheel of the bicycle, a force converter for transferring the application force into a rotary motion of the drive wheel, and a shifting mechanism located about the drive lever for selectively changing a drive ratio between the drive lever and the drive wheel.

In accordance with yet another aspect, the present invention comprises a lever drive having at least one drive lever pivotable about an axis, a force applicator connected to the drive lever for receiving an application force to overcome a resistance force that is acting on the lever, a force converter for transferring the application force into a rotary motion of a receiving element associated with the resistance force, and a shifting mechanism located about the at least one drive lever for selectively changing the resistance force that is acting on the lever.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principals of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, a lever driven bicycle includes at least one drive lever arrangement. The drive lever arrangement has a drive lever pivotable about an axis, a force applicator connected to the drive lever for receiving a human application force to rotate a drive wheel, a force converter for transferring the human application force into a rotary motion of the drive wheel, and a shifting mechanism located about the at least one drive lever for selectively changing a drive ratio between the at least one drive lever and the drive wheel.

Figure 1:
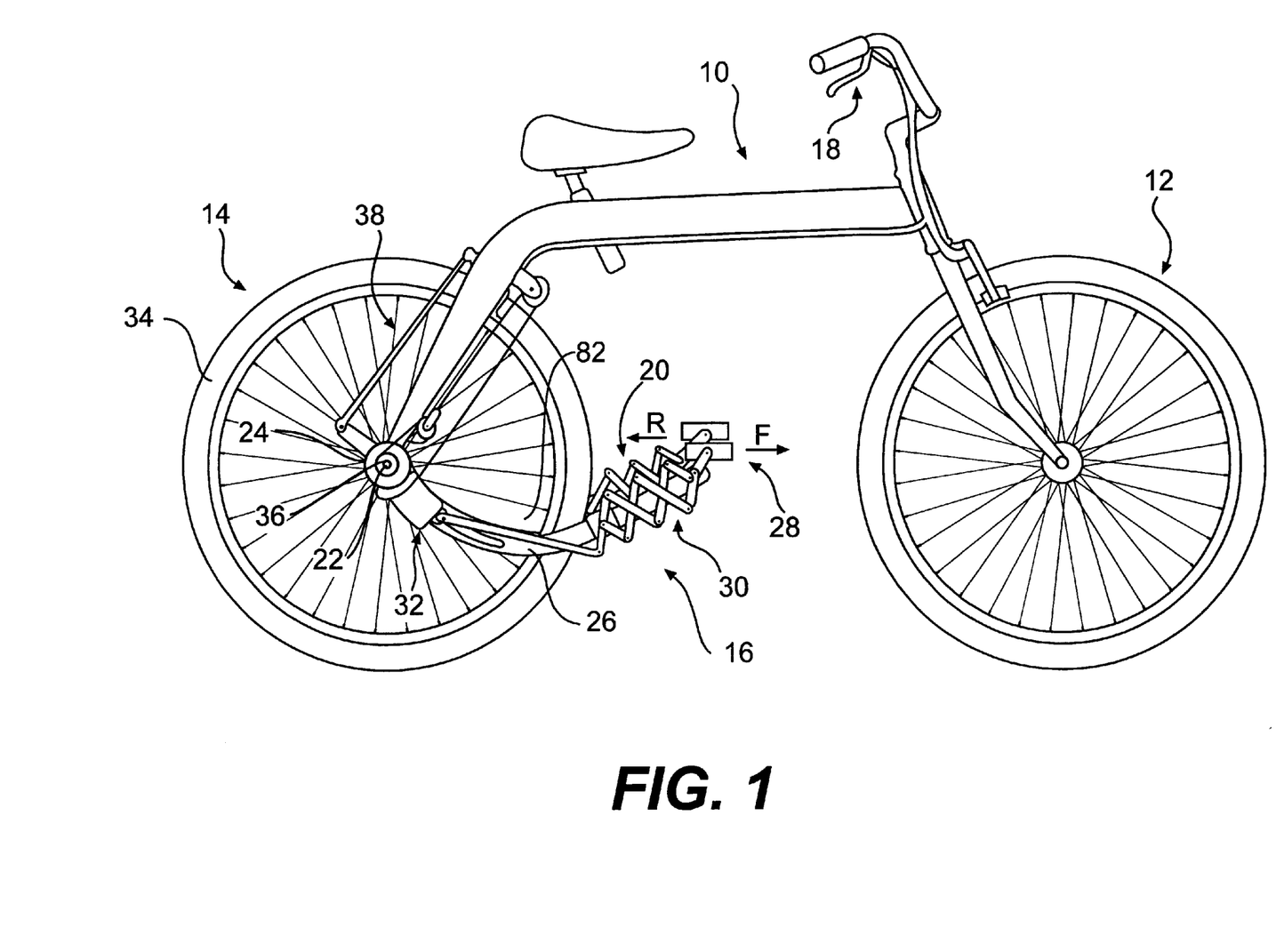
FIG. 1 is a side view of a dual lever driven bicycle according to a first embodiment of the present invention.

In FIG. 1 of the drawings, a preferred embodiment of the invention is incorporated in a bicycle including a frame 10, a front wheel assembly 12, a rear wheel assembly 14, and a lever drive arrangement 16. With the exception of the lever drive arrangement 16, and those elements associated therewith, the bicycle includes all of those elements normally found on conventional crank driven bicycles, such as, for example, handle bar located braking systems 18. The bicycle of FIG. 1 is driven by the oscillation of two, rear wheel located, lever drive arrangements 16, 20 formed on each side of the bicycle, one associated with each leg of the bicycle rider. The lever drive arrangements 16, 20 pivot about a common pivot axis 22, which is concentric with the axis of the rear wheel hub 24. Each lever drive arrangement 16, 20 generally includes a drive lever 26, a force applicator 28, a shifting mechanism 30, and a force converter 32. The driving of the rear wheel 34 takes place during a downward stroke of the drive lever 26, with the drive lever 26 capable of returning to a topmost position because of its connection to the rear wheel hub 24 via a one-way clutch 36. The dual drive levers 16, 20 are constrained to move in equal opposing relation through a rocker arm linkage connection 38 connected to the rear section of each drive lever 26.

Figure 2:
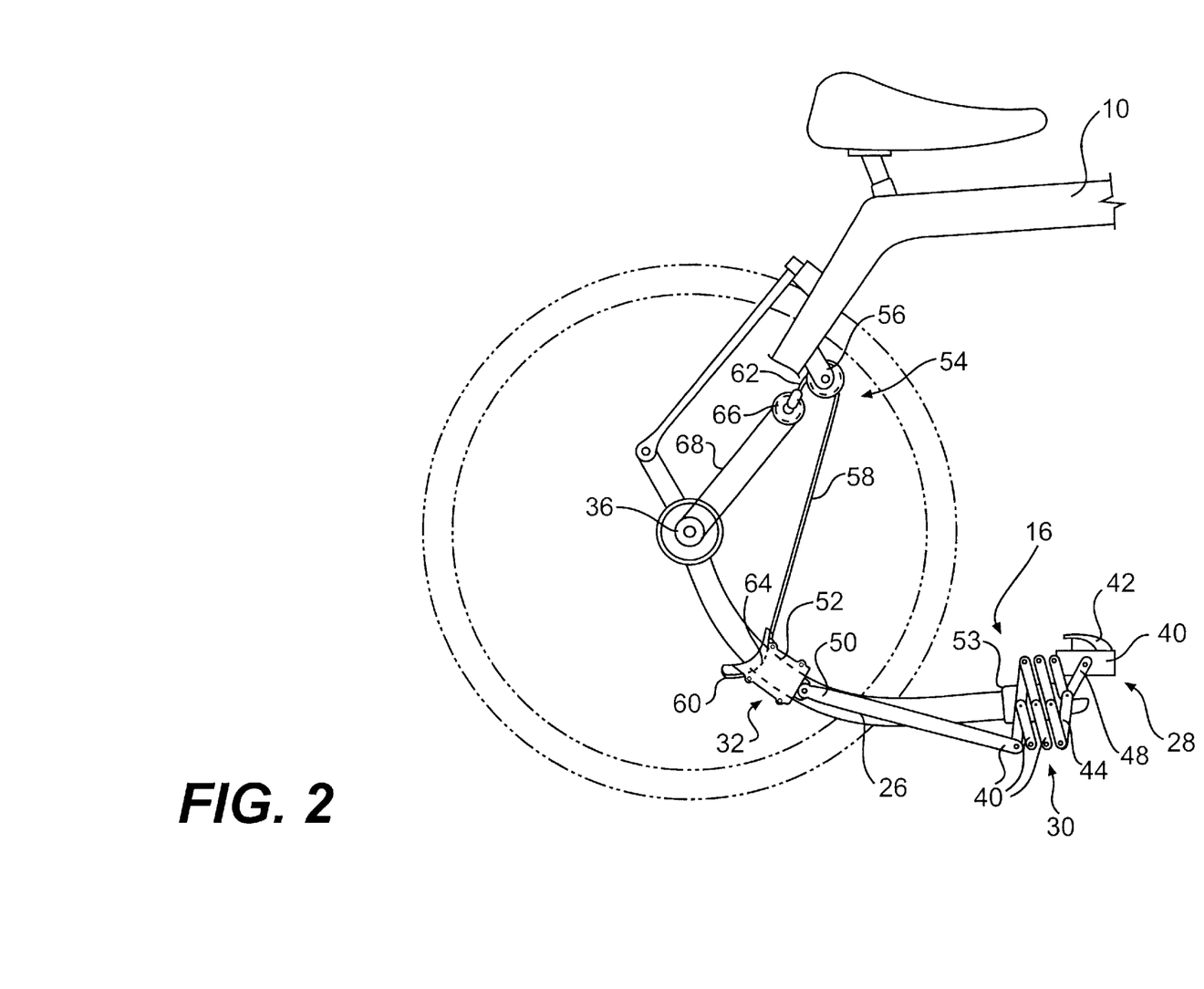
FIG. 2 is a partial side view of the bicycle of FIG. 1 showing the lever drive arrangement in a high speed position.

As shown in FIG. 2, each lever drive arrangement 16, 20 is formed in the same manner and, therefore, only one will be described in detail. The drive lever 26 of the lever drive arrangement 16 is formed in a substantially curved configuration with a generally rectangular cross-section (not shown). The force applicator 28 receives a rider's foot and is located adjacent a front-most portion of the drive lever 26. Connected to the force applicator 28, and located rearward on the drive lever 26, is the shifting mechanism 30 which controls the drive ratio between the drive lever 26 and the driven wheel 34. A rear portion of the drive lever includes the force converter 32 for converting the downward displacement of the drive lever 26 to a rotation displacement of the drive wheel 34.

The force applicator 28 of the lever drive arrangement 16 includes a pedal 40 for engagement with the rider's foot. The pedal can include an optional toe clip 42, which allows for both downward and upward force application upon the drive lever by the rider. The pedal 40 is pivotably connected to a front most portion of the shifting mechanism 30.

The shifting mechanism 30 includes an extendable linkage 44 made up of a plurality of individual links 46 connected to each other and to the drive lever 26 so as to be extendable along the drive lever 26. The extendable linkage 44 has a front linkage end 48 and a rear linkage end 50, the front linkage end 48, while being connected to the pedal 40, is also pivotably connected to a drive lever front portion. The rear linkage end 50 of the extendable linkage 44 is pivotably connected to a slide block 52, which will be described in further detail below. Intermediate the front and rear linkage ends 48, 50 is a slidable linkage guide 53 that slides about the drive lever 26 and has pivotably mounted thereon the extendable linkage 44. The connection of the pedal 40, extendable linkage 44, and slide block 52 about the drive lever 26 provides for a controllable positioning of the slide block 52 through a rider's displacement of the pedal 40 in a frontward and rearward direction, as shown by the arrows F and R of FIG. 1. A front-most positioning of the pedal 40 results in a full extension of the extendable linkage 44 and displacement of the slide block 52 to a maximum rear position on the drive lever 26 (as shown in FIG. 1). Conversely, a rear-most positioning of the pedal 40 results in the most retracted position of the extendable linkage and a displacement of the slide block 52 to a maximum front position of the drive lever 26 (as shown in FIG. 2). The position of the slide block 52 corresponds to a drive ratio between the displacement of the lever 26 and the displacement of the drive wheel 34. When the slide block 52 is at its maximum rear position on the drive lever 26 (FIG. 1), the resistance to downward thrust of the drive lever 26 is a minimum and the amount of rotational displacement of the wheel 34 resulting from the downward displacement of the drive lever 26 is the least. This slide block position 52 corresponds to a low bike speed position. In contrast, when the slide block 52 is at its maximum front position (FIG. 2) the resistance to downward thrust of the drive lever 26 is at a maximum with a resulting rotational displacement of the wheel 34 being its greatest. This latter slide block position 52 corresponds to a high bike speed position.

The force converter 32 of the lever drive device 16 includes a pulley arrangement 54 for converting the downward force of the drive lever 26 to a rotational force upon the wheel 34. The pulley arrangement 54 includes an idler pulley 56 fixedly connected to the bicycle frame 10. The idler pulley 56 receives a bendable cord 58 which has a first cord end 60 and a second cord end 62, wherein the first cord end 60 is fixedly connected to a partial pulley 64 of the slide block 52 and the second cord end 62 is connected to a movable pulley 66. The movable pulley 66 receives a constant force extension spring 68 which is fixed at one end to the bicycle frame 10 and coiled about the one way clutch 36 of the rear wheel hub 24 at its other end.

The curve of the drive lever 26, along with the partial pulley 64 of the slide block 52, reduce the tangential forces acting upon the slide block by the bendable cord 58. Therefore, the position of the slide block 52 about the drive lever 26 is minimally influenced by the bendable cord 58.

The resulting configuration of the force converter 32 transfers the downward displacement of the drive lever 26 through the bendable cord 58 to pull the movable pulley 66 radially away from the rear wheel hub 24, which pulls the constant force extension spring 68 away from the rear wheel hub 24, resulting in a rotation of the rear wheel 34 in the engagement direction of the one way clutch 36. Upon a displacement of the drive lever 26 in an upward direction, the movable pulley 66 travels radially toward the rear wheel hub 24 and the constant force extension spring 68 spools back about the one-way clutch assembly 36, rotating the clutch 36 in a non-engaged rotation direction. The bendable cord 58 of the present embodiment may be, for example, a steel cable.

Figure 3:
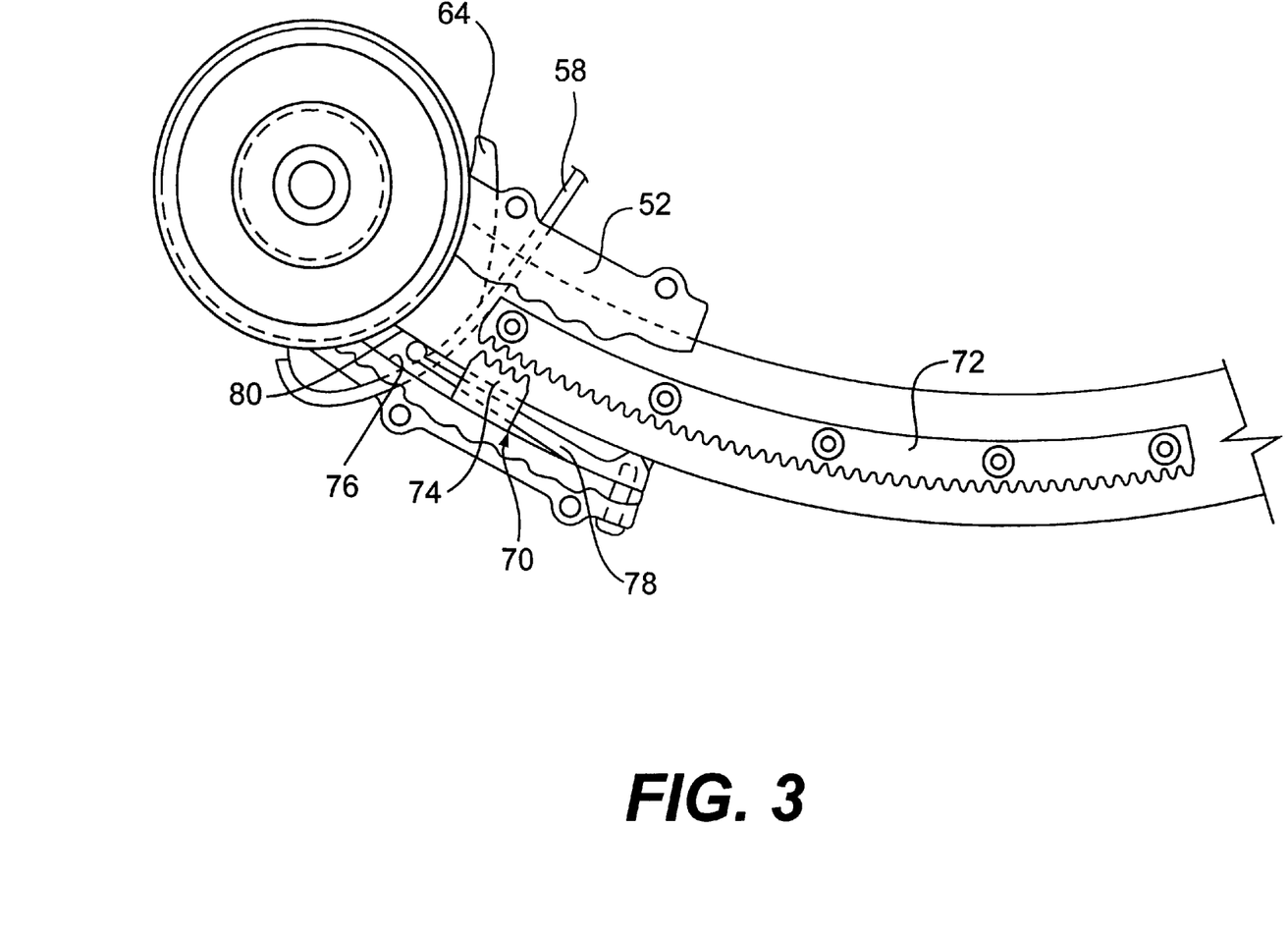
FIG. 3 is a partial view of the bicycle of FIG. 1 illustrating the drive lever and slide block.

The control block 52 of FIGS. 1 and 2 is further illustrated in FIG. 3, wherein the slide block 52 includes a locking arrangement 70 for locking the slide block 52 in place during a downward displacement of the drive lever 26, and releasing the slide block 52 for sliding movement along the drive lever 26 during upward displacement of the drive lever 26.

The locking arrangement 70 includes a downwardly projecting drive lever rack 72 fixed to the drive lever 26, and an upwardly projecting slide block rack 74 fixed on a lower interior portion of the slide block 52. The slide block 52 further includes an interior surface 76 of a size which allows upward and downward displacement of the slide block 52 from an engaged, upward position where the drive lever rack 72 and slide block rack 74 mesh, to a disengaged, downward position where the drive lever rack 72 and slide block rack 74 do not mesh. The slide block 52 is urged in the engaged, upward position by the pulling force of the bendable cord 58 upon the partial pulley 64 of the slide block 52 during downward displacement of the drive lever 26. A flat spring 78 is located within the slide block 52 against a lower interior surface 76 of the slide block 52 and a lower surface 80 of the drive lever 26 for biasing the slide block 52 in the downward, disengaged direction. The biasing force of the flat spring 78 is of a magnitude to disengage the slide block rack 74 and drive lever rack 72 upon an upward displacement of the drive lever 26, but not of a sufficient magnitude to overcome the pulling force of the bendable cord 58 upon the slide block 52 during downward displacement of the drive lever 26. This engaging and disengaging of the slide block rack 74 and drive lever rack 72 allows for locking of the slide block 52 during a downward displacement of the drive lever 26 and sliding displacement of the slide block 52 along the drive lever 26 during upward displacement of the drive lever 26. An alternative locking arrangement (not shown) includes a friction engagement between the slide block 52 and drive lever 26 to replace the engaging slide block rack 74 and drive lever rack 72 of the above described locking arrangement 70.

Therefore, in conjunction with the shifting mechanism detailed above, the location of the sliding block 52 can be controllably positioned along the drive lever 26 between its maximum rear position and its maximum front position by way of a rider initiated movement of the pedal 40 in a frontward or rearward direction (F,R) during displacement of the drive lever 26 in the upward direction.

Figure 4:
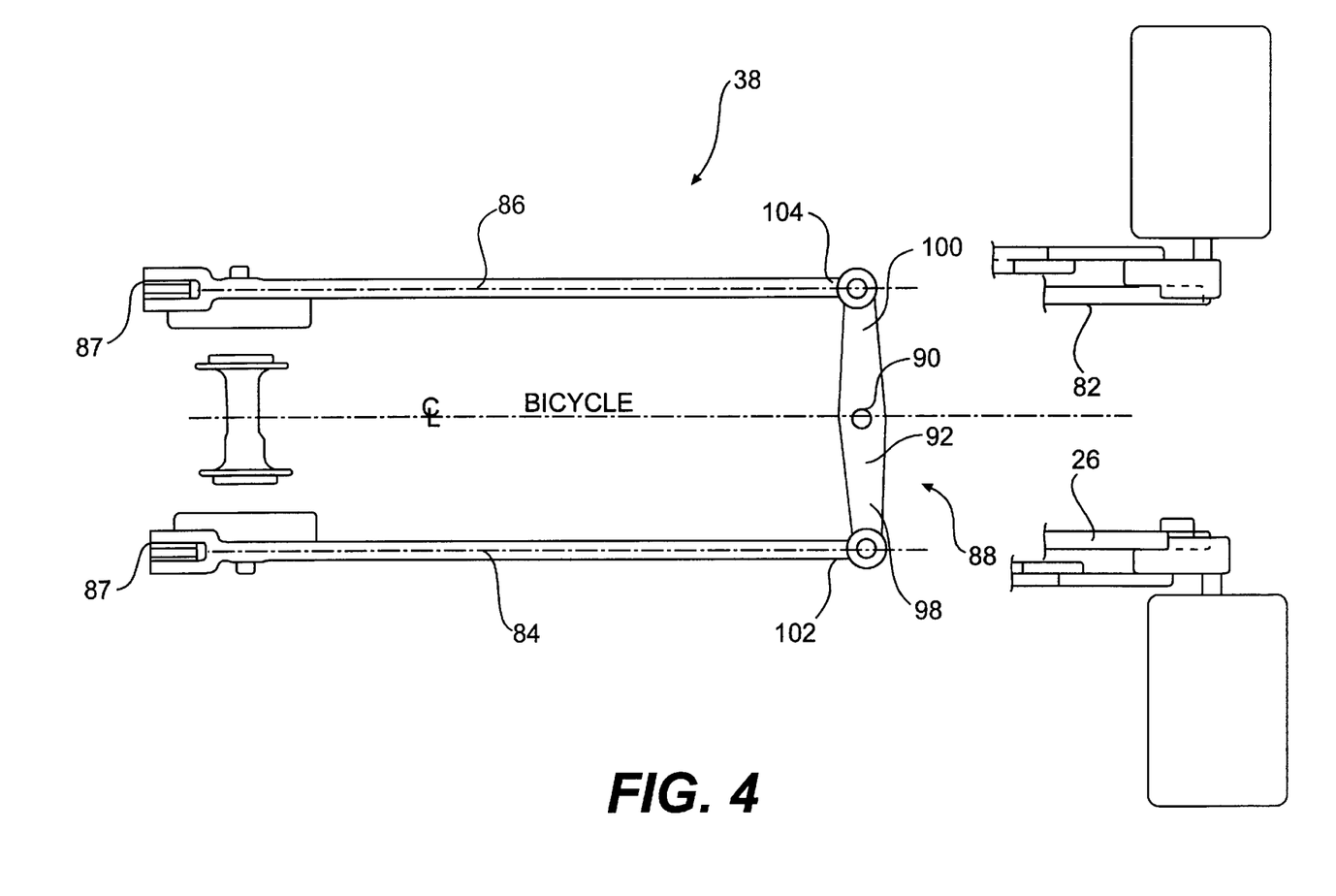
FIG. 4 is a partial view of the bicycle of FIG. 1 illustrating the rigid linkage connecting the dual lever drive arrangements.

The embodiment of FIG. 1 includes two drive levers 26, 82, one on each side of the bicycle. These two drive levers 26, 82 are connected to each other through a rocker arm linkage connection 38 as depicted in FIG. 4. The rocker arm linkage connection 38 includes two drive lever rods 84, 86, one pivotally connected to a rod end bearing 87 located at a rearmost portion of each drive lever 26, 82, and a rocker arm 88 for mechanically connecting a top end 102, 104 of the drive lever rods 84, 86. The rocker arm 88 is pivotally fixed about its center 90 to the bicycle frame 10 and includes a horizontal member 92. Ends 98, 100 of the horizontal member are pivotably connect to the top ends 102, 104 of respective drive lever rods 84, 86. The rocker arm linkage connection 38 provides for simultaneous opposite displacement of the drive levers 26, so that, for example, downward displacement of one drive lever 26 causes an upward displacement of its associated drive lever rod 84, which results in the horizontal member 92 pivoting about its center 90 and pushing the opposite drive lever rod 86 in a downward direction, thereby producing an upward displacement of the second drive lever 82.

Figure 5:
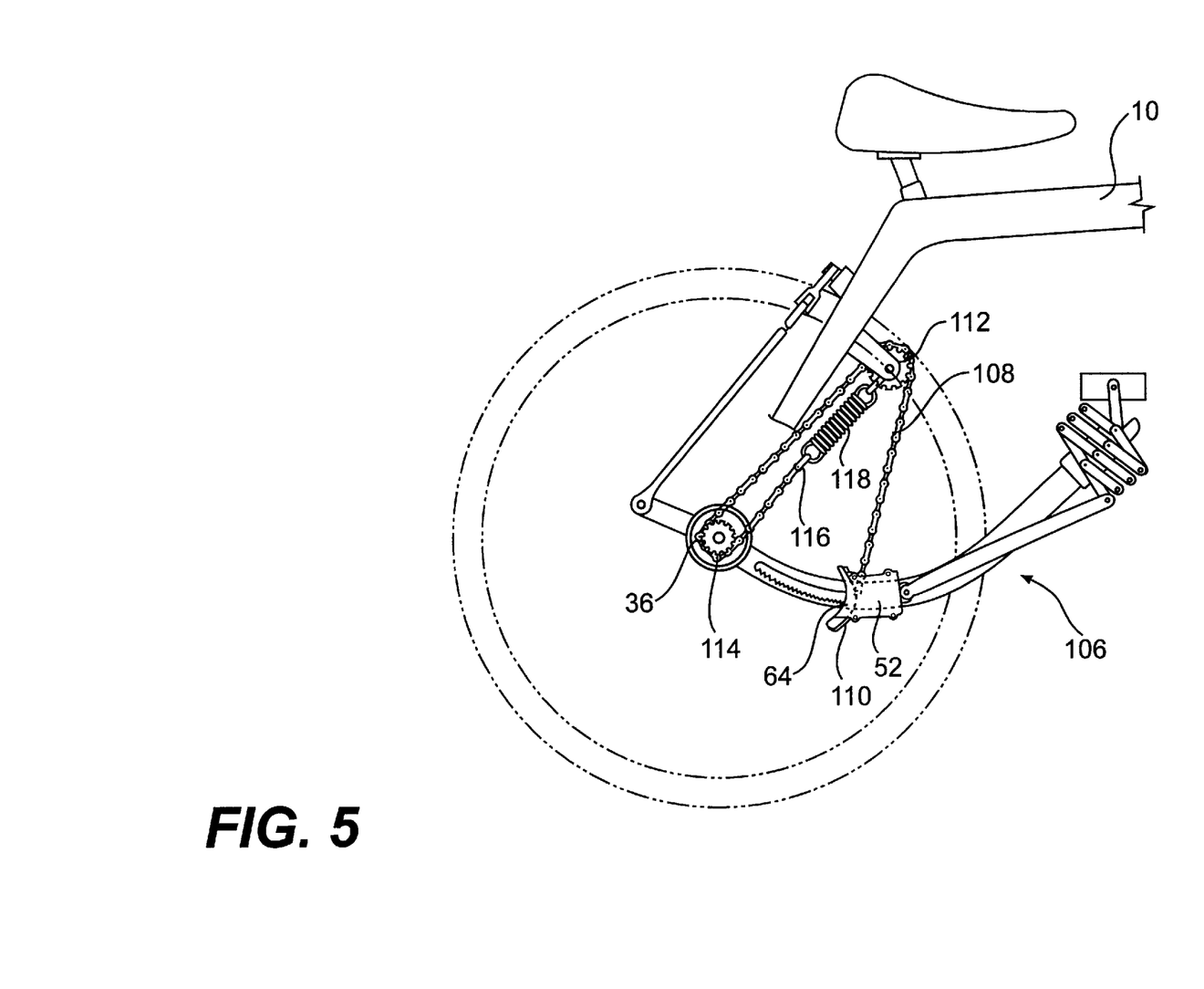
FIG. 5 is a partial side view of an alternative bendable cord used in the lever drive arrangement of the present invention.

FIG. 5 illustrates an alternate lever drive arrangement 106 utilizing a bendable cord comprising a chain linkage 108. The chain linkage 108 is connected at one end 110 to the slide block 52 over the partial pulley 64, extended about a toothed idler pulley 112 and toothed sprocket 114 of a one way clutch 36, and finally connected at a second end 116 to a tension coil spring 118 fixed to the bicycle frame 10. This arrangement, as with the cable arrangement noted above, translates the downward displacement of the drive lever 26 to a rotational displacement of the rear wheel 34. The tension coil spring 118 provides a bias to assure correct engagement of the chain linkage 108 with the idler pulley 112 and sprocket 114.

Figure 6:
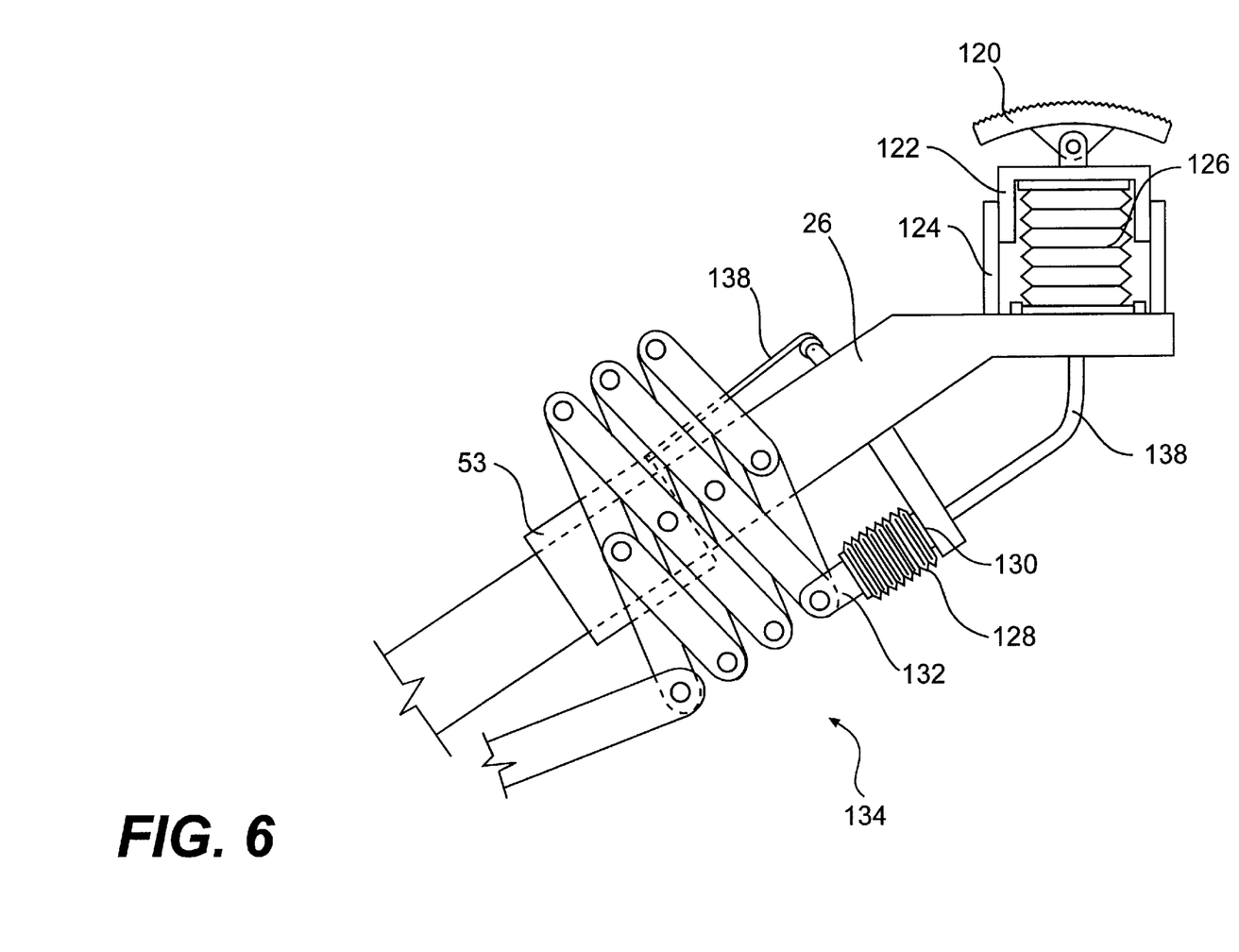
FIG. 6 is a partial side view of an alternative force applicator and shifting mechanism of the present invention.

In the alternative pedal and expandable linkage configuration shown in FIG. 6, the pedal includes a foot portion 120 pivotably connected to a hydraulic piston 122 which, together with a receiving portion 124, forms a collapsible and expandable hydraulic chamber 126. The hydraulic chamber 126 is in fluid communication with an expandable bellows 128 for expanding or contracting the bellows 128. The expandable bellows 128 is rigidly fixed at a first end 130 to the drive lever 26 and at a second end 132 to a pivot point of an expandable linkage 134. Upon downward thrust of the foot portion 120 the hydraulic piston 122 displaces to contract the hydraulic chamber 126, therein causing a flow of fluid from the hydraulic chamber 126 through a hydraulic line 138 and into the expandable bellows 128. This creates an expansion of the bellows 128 and moves the expandable linkage 134 for controlled positioning of the slide block 52. A constant force extension spring 138 is fixed between the slidable linkage guide 53 and a forward portion of the drive lever 26 so as to maintain a returning force upon the expandable bellows 128. Such a returning force effectively urges the expandable linkage 134 toward its collapsed condition and raises the hydraulic piston 122 during the upward displacement of the drive lever 26. This pedal and expandable linkage arrangement replaces the frontward and rearward pedal displacement slide block control of FIG. 1 with a more ergonomic upward and downward pedal displacement.

Figure 7:
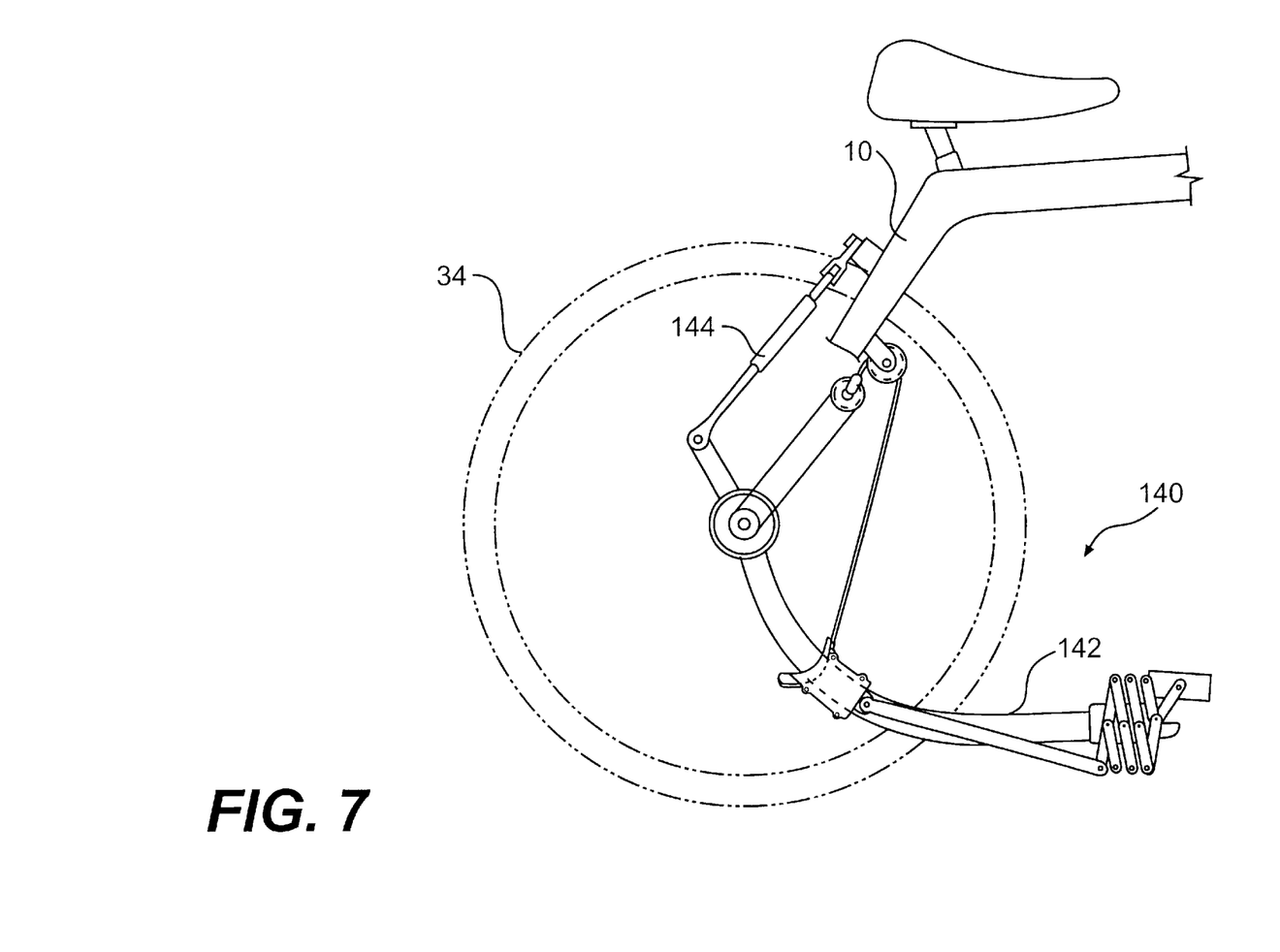
FIG. 7 is a partial side view of a bicycle utilizing a single drive lever arrangement according to a second embodiment of the invention.

FIG. 7 illustrates a second embodiment of a lever driven bicycle according to the present invention. Such an embodiment utilizes a single lever drive arrangement 140 to drive the rear wheel 34. Without the rocker arm linkage connection 38 of the dual lever drive arrangement 16, 20 of the first embodiment, the drive lever 142 of the single lever embodiment is returned to its upper position by way of a compression type spring 144. Such a spring 144 may be, for example, a gas spring pivotably connected to the rearmost portion of the drive lever 142 at one end and to the bicycle frame 10 at another end. All other features of this embodiment correspond to those detailed above with regard to the first embodiment. This embodiment reduces the number of parts associated with the dual lever drive arrangement 16, 20 for those riders who are unable to displace a second drive lever.

Figure 8:
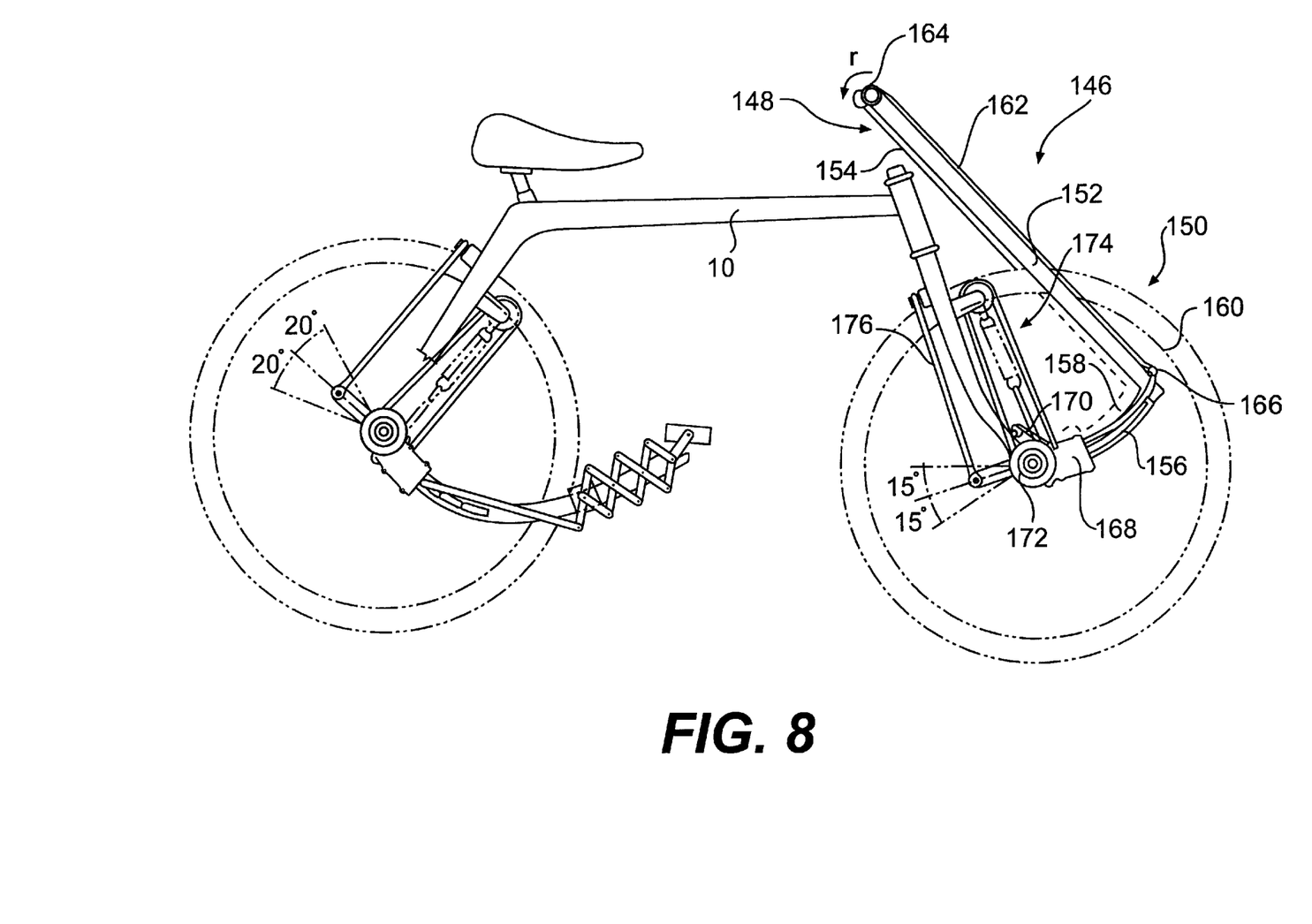
FIG. 8 is a side view of a bicycle illustrating a front and rear lever driving arrangement according to a third embodiment of the present invention.

FIG. 8 illustrates a third embodiment of a lever driven bicycle according to the present invention. This third embodiment includes those designs set forth with regard to the first embodiment, and in addition, a dual front lever drive arrangement 146, 148 located about the front wheel assembly 150 of the lever driven bicycle. The dual front lever drive arrangement 146, 148 is similar to that of the dual rear lever drive arrangement 16, 20, with a few modifications. The individual front lever drive arrangements 146, 148 each include a force applicator including a handle bar rod 152, 154 fixedly connected at a frontward portion of a drive lever 156, 158. The handle bar rods 152, 154 extend upwardly and are bent outwardly from the bicycle center line at a top end. The two handle bar rods together form a steering and lever driving mechanism for the bicycle. Displacement of the handle bar rods 152, 154 in a forward and rearward direction results in a rotation of the front wheel 160.

The shifting mechanism of the handle bar rod 152 includes a shifting cord 162 running from rotatable hand grips 164 located at the top end of the handle bar rod 152, down along the handle bar rod, then about a pulley 166 located adjacent the front end of the drive lever 156, and finally fixed to a front portion of a slide block 168. Further, the shifting mechanism includes a constant force extension spring 170 fixed between a rear portion of the slide block 168 and a portion of the frame 10 adjacent the front wheel hub 172. The constant force extension spring 170 provides a force which biases the slide block 168 toward the front wheel hub 172. Such a shifting mechanism of the third embodiment controls the position of the slide block 168 upon upward motion of the drive lever 156 by controlling the length of the shifting cord 162 via rotation of the rotating grip 164. Complete rotation of the rotating grip 164 in the forward direction (indicated by the arrow f) allows the constant force extension spring 170 to position the slide block 168 in the low speed position adjacent the front wheel hub 172, while rotation of the grip 164 in the rearward direction (indicated by the arrow r) moves the slide block 168 toward its maximum front, high speed, location. The shifting mechanism of the handle bar rod 154 includes those elements described with regard to handle bar rod 152.

The front wheel lever drive arrangement 146, 148 includes a force converter 174 and rocker arm linkage 176 in a manner set forth in the description of the various rear wheel lever drive arrangement embodiments.

Further modifications and embodiments of the invention are contemplated, such as a lever driven bicycle which is solely driven by two front wheel located lever drive arrangements, a lever driven bicycle which is driven by one rear wheel located lever drive arrangement and two front wheel located lever drive arrangements, or an exercise device utilizing the disclosed lever drive arrangements.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A lever driven bicycle comprising:
   at least one drive lever pivotable about an axis;
   a force applicator connected to the drive lever for receiving an application force to rotate a drive wheel of the bicycle;
   a force converter for transferring the application force into a rotary motion of the drive wheel; and
   a shifting mechanism located about the at least one drive lever for selectively changing a drive ratio between the at least one drive lever and the drive wheel, the shifting mechanism including the force applicator.

2. The lever driven bicycle of claim 1, wherein:
   the force applicator includes a pedal; and
   the shifting mechanism includes an expandable linkage and slide block connected to the pedal.

3. The lever driven bicycle of claim 2, wherein:
   the pedal includes an expandable and contractible hydraulic cylinder for hydraulically controlling a length of the expandable linkage.

4. The lever driven bicycle of claim 2, wherein:
   the force converter includes a pulley arrangement connecting the slide block with a one way clutch of the drive wheel.

5. The lever driven bicycle of claim 4, wherein:
   the pulley arrangement of the force converter further includes a bendable cord connected at a first end to a partial pulley of the slide block, connected at a second end to a movable pulley, and received about an idler pulley at an intermediate portion, and the movable pulley is connected to a constant force extension spring fixed about the one way clutch;
   the slide block of the shifting mechanism further includes a locking arrangement including a slide block rack for locking engagement and disengagement with the at least one drive lever; and
   the extendable linkage of the shifting mechanism is connected to the pedal at a first extendable linkage end and to the slide block at a second extendable linkage end, said pedal controlling the extension of the extendable linkage upon the disengagement of the slide block with the at least one drive lever.

6. The lever driven bicycle of claim 4, wherein:
   the pulley arrangement of the force converter further includes a bendable cord connected at a first end to a partial pulley of the slide block, connected at a second end to a coil spring, and received about an idler pulley and sprocket of the drive wheel at an intermediate portion;
   the slide block of the shifting mechanism further includes a locking arrangement including a slide block rack for locking engagement and disengagement with the at least one drive lever; and
   the extendable linkage of the shifting mechanism is connected to the pedal at a first extendable linkage end and to the slide block at a second extendable linkage end, said pedal controlling a length of the extendable linkage upon the disengagement of the slide block with the at least one drive lever.

7. The lever driven bicycle of claim 1, including:
   a second drive lever pivotable about said axis;
   a second force applicator connected to the second drive lever for receiving a second application force to further rotate the drive wheel of the bicycle;
   a second force converter for transferring the second application force into a rotary motion of the drive wheel; and
   a second shifting mechanism located about the second drive lever for selectively changing a second drive ratio between the second drive lever and the drive wheel the second shifting mechanism including the second force applicator.

8. The lever driven bicycle of claim 7, wherein:
   the first and second force applicators each include a pedal; and
   the first and second shifting mechanisms each include an expandable linkage and slide block connected to a respective pedal.

9. The lever driven bicycle of claim 7, wherein:
   the first and second drive levers are rigidly connected to each other with a rocker arm linkage.

10. The lever driven bicycle of claim 7, wherein:
    the first and second force applicators each include a handle bar rod;
    the first and second shifting mechanisms each include a shifting cord connected to a slide block; and
    the first and second force converters each include a pulley arrangement connecting the slide block to a one way clutch of the drive wheel.

11. The lever driven bicycle of claim 10, wherein:
    the pulley arrangement of the first and second force converters further includes a bendable cord connected at a first end to a partial pulley of the slide block, connected at a second end to a movable pulley, and received about an idler pulley at an intermediate portion, and the movable pulley is connected to a constant force extension spring fixed about the one way clutch;

the slide block of the first and second shifting mechanisms further includes a locking arrangement including a slide block rack for locking engagement and disengagement of the drive lever; and the shifting cord of the first and second shifting mechanisms is connected to a top portion of the handle bar rod at a first shifting cord end and to the slide block at a second shifting cord end, the top portions of the handle bar rod including a rotatable hand grip controlling a length of the shifting cord upon disengagement of the slide block with the drive lever.

12. The lever driven bicycle of claim 10, wherein:
the first and second drive levers are rigidly connected to each other with a rocker arm linkage.

13. The lever driven bicycle of claim 7, wherein:
the first and second force converters each include a pulley arrangement connecting the slide block with a one way clutch of the drive wheel.

14. The lever driven bicycle of claim 1, wherein:
the drive lever is biased in an upward direction by a gas spring.

15. The lever drive arrangement comprising:
at least one drive lever pivotable about an axis;
a force applicator connected to the drive lever for receiving an application force to overcome a resistance force that is acting on the lever;
a force converter for transferring the application force into a rotary motion of a receiving element associated with the resistance force; and
a shifting mechanism located about the at least one drive lever for selectively changing the resistance force that is acting on the lever, the shifting mechanism including the force applicator.

16. The lever drive arrangement of claim 15, wherein:
the force applicator includes a pedal; and
the shifting mechanism includes an expandable linkage and slide block connected to the pedal.

17. The lever drive arrangement of claim 16, wherein:
the pedal includes an expandable and contractible hydraulic cylinder for hydraulically controlling a length of the expandable linkage.

18. The lever drive arrangement of claim 15, including:
a second drive lever pivotable about said axis;
a second force applicator connected to the second drive lever for receiving a second application force to overcome a second resistance force;
a second force converter for transferring the second application force into a rotary motion of the receiving element; and
a second shifting mechanism located about the second at least one drive lever for selectively changing the second resistance force that is acting on the second lever, the second shifting mechanism including the second force applicator.

19. The lever drive arrangement of claim 18, wherein:
the first and second force applicators each include a pedal; and
the first and second shifting mechanisms each include an expandable linkage and slide block connected to a respective pedal.

20. The lever drive arrangement of claim 19, wherein:
the first and second force converters each include a pulley arrangement connecting the slide block with the resistance force.

21. The lever drive arrangement of claim 18, wherein:
the first and second drive levers are rigidly connected to each other with a rocker arm linkage.

22. The lever drive arrangement of claim 18, wherein:
the first and second force applicators include a handle bar rod;
the first and second shifting mechanisms include a shifting cord connected to a slide block; and
the first and second force converters include a pulley arrangement connecting the slide block to the resistance force.

23. The lever drive arrangement of claim 22, wherein:
the pulley arrangement of the first and second force converters further includes a bendable cord connected at a first end to a partial pulley of the slide block, connected at a second end to a movable pulley, and received about an idler pulley at an intermediate portion, and the movable pulley is connected to a constant force extension spring fixed about a one way clutch of the receiving element;

the slide block of the first and second shifting mechanisms further includes a locking arrangement including a slide block rack for locking engagement and disengagement with the drive lever; and the shifting cord of the first and second shifting mechanisms are connected to a top portion of the handle bar rod at a first shifting cord end and to the slide block at a second shifting cord end, the top portion of the handle bar including a rotatable hand grip for controlling a length of the shifting cord upon disengagement of the slide block with the drive lever.

24. The lever drive arrangement of claim 22, wherein:
the first and second drive levers are rigidly connected to each other with a rocker arm linkage.

25. The lever drive arrangement of claim 15, wherein:
the receiving element is a drive wheel of a bicycle.

26. The lever drive arrangement of claim 15, wherein:
the force converter includes a pulley arrangement connecting the slide block with the receiving element.

27. The lever drive arrangement of claim 26, wherein:
the pulley arrangement of the force converter further includes a bendable cord connected at a first end to a partial pulley of the slide block, connected at a second end to a movable pulley, and received about an idler pulley at an intermediate portion, and the movable pulley is connected to a constant force extension spring fixed about a one way clutch of the receiving element;

the slide block of the shifting mechanism further includes a locking arrangement including a slide block rack for locking engagement and disengagement with the at least one drive lever; and the extendable linkage of the shifting mechanism is connected to the pedal at a first extendable linkage end and to the slide block at a second extendable linkage end, said pedal controlling the extension of the extendable linkage upon the disengagement of the slide block with the at least one drive lever.

28. The lever drive arrangement of claim 15, wherein:
the drive lever is biased in an upward direction by a gas spring.

* * * * *